Nov. 28, 1967  C. H. KEITH II, ET AL  3,355,317
PROCESS OF IMPREGNATING ADSORBENT MATERIALS
WITH METAL OXIDES
Filed March 18, 1966
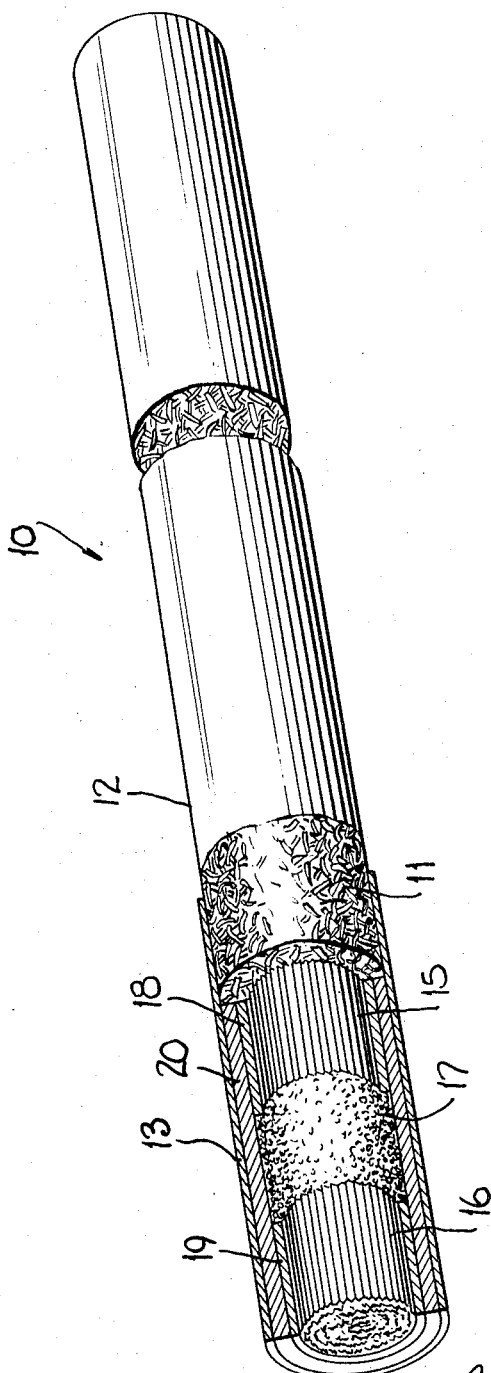
INVENTORS
CHARLES H. KEITH, II
VELLO NORMAN
WILLIAM W. BATES, JR.
BY
Kenyon & Kenyon
ATTORNEYS

United States Patent Office 3,355,317
Patented Nov. 28, 1967

3,355,317
PROCESS OF IMPREGNATING ADSORBENT MATERIALS WITH METAL OXIDES
Charles H. Keith II, Charlotte, Vello Norman, Chapel Hill, and William W. Bates, Jr., Durham, N.C., assignors to Liggett & Myers Tobacco Co., New York, N.Y., a corporation of New Jersey
Filed Mar. 18, 1966, Ser. No. 535,601
6 Claims. (Cl. 117—100)

This application is a continuation-in-part of our copending application Ser. No. 262,653 filed Mar. 4, 1963, now Patent No. 3,251,365 issued May 17, 1966.

This invention relates to processes for impregnation of gas adsorbent materials and more particularly to processes for impregnating gas adsorbent materials with metal oxides for use in cigarette filters.

The impregnation of gas adsorbent materials with metal oxides in order to increase their adsorptive capacity for specific gases is known. An impregnation method which has been reported in the prior art is to immerse the carbon in an ammoniacal solution containing a compound of the impregnating metal. The carbon is separated from the impregnating solution and heated in order to convert the metal compound into an oxide of the metal. The concentration of ammonia in these previously known aqueous impregnating solutions has been far below saturation, for example on the order of 10 to 12% by weight.

The previously known impregnation processes have been found not to be fully satisfactory for the impregnation of gas adsorbent materials such as activated carbon, alumina, natural and synthetic clays and silica gels having a high surface to volume ratio, with an area in excess of about 1 million square centimeters per gram, such as those used in cigarette filters. Adsorbent materials having a very high surface to volume ratio have large numbers of exceedingly small pores which are not penetrated and frequently are plugged by impregnating solutions used in the prior art.

It is an object of this invention to provide an improved process for the impregnation of adsorbent materials having a high surface to volume ratio. More especially it is an object of this invention to provide an improved impregnation process in which the impregnation is efficiently deposited on the surfaces of the adsorbent materials without plugging of the pores.

Accordng to this invention a gas adsorbent material is contacted with an aqueous impregnating solution containing about 20 to 29% by weight of ammonia and also containing a metal compound which is soluble in the aqueous ammoniacal solution and decomposable into a metal oxide impregnant. The excess impregnating solution is removed and the moist adsorbent material is heated and dried at a temperature in the range of about 175° to about 500° C. in order to convert the metal compound into a metal oxide.

Although the invention will be described hereinafter with particular reference to activated carbon, any high surface to volume ratio gas adsorbent material such as activated carbon, alumina, natural and synthetic clays and silica gel may be used according to this invention. Preferred carbons are those having a surface area in excess of 1 million square centimeters per gram, and best results are generally obtained when the surface area is in excess of 5 million square centimeters per gram. Adsorbent carbons of this type are commercially available. One such carbon which has been found suitable is Pittsburgh Activated Carbon Company Grade BPL gas adsorbent carbon. The carbon adsorbent has a particle size which is generally in the range of 8 to 300 mesh, U.S. Standard Sieve Series.

The first step in the process of this invention consists in immersing the adsorbent carbon in an aqueous ammoniacal impregnating solution containing at least one compound of a metal to be impregnated. The metals which can be impregnated in this manner are those metals whose ions form complexes with ammonia. Examples are cobalt, copper, zinc, iron, molybdenum and silver.

The impregnating solution contains at least 20% by weight of $NH_3$ (some of which is present in the form of $NH_4OH$). For best results the solution should be saturated or substantially saturated with respect to ammonia; that is, it will contain about 28 or 29% by weight of ammonia. It has been found that impregnating solutions which are substantially saturated with respect to ammonia or at least contain more than 20% by weight of ammonia are far superior to solutions having lower concentrations of ammonia. This is particularly true when the carbon or charcoal to be impregnated has a very high surface area, for example in excess of about 1 million square centimeters per gram. The reason for this improved efficiency of impregnation is believed to be that the substantially saturated ammoniacal solutions of this invention yield a much greater gas volume than conventional impregnating solutions during the subsequent heating step in which the metal compound is converted into a metal oxide. The rapid liberation of large quantities of ammonia during heating prevents the plugging of the pores by the impregnant.

The impregnating solution also contains one or more metal compounds which are soluble in the aqueous ammoniacal solution and decomposable into a metal oxide impregnant. The metal or metals in solution and the concentration thereof are chosen in accordance with the desired metal oxides and their amounts in the impregnated carbon product.

The impregnating solution is made by dissolving the metal compound in an aqueous solution of ammonia which contains at least 20% $NH_3$ by weight and which is preferably saturated with ammonia. The metal compound is generally a salt of an organic acid such as carbonic acid or oxalic acid. Carbonates are preferred salts because they result in the liberation of carbon dioxide as well as ammonia during the subsequent heating step furnishing additional quantities of gas to prevent plugging of the carbon pores. Other organic salts such as oxalates, citrates and tartrates are similarly preferred since they liberate copious quantities of $CO_2$ and other gaseous products upon thermal decomposition. Salts such as chlorides which leave a residue on heating in the carbon are preferably avoided, since it is desirable to convert all of the soluble metal impregnating compound into the metal oxide.

Any metal which forms a complex with ammonia in aqueous solution can be impregnated according to this invention. However, the adsorbent carbons which are of greatest usefulness in cigarette filters are those which are impregnated with about 0.5 to 13% by weight, and preferably 4 to 6% by weight, of an oxide of a metal selected from the group consisting of cobalt, copper and zinc. The adsorbent carbon may be impregnated with the oxides of two or more metals if desired, provided the total loading of metal oxide impregnants does not exceed 14% by weight, based on the weight of dry unimpregnated carbon. Preferred impregnated carbons which can be produced by this invention are those containing 0.5 to 13% by weight of an oxide or a metal selected from the group consisting of cobalt, copper and zinc, and 0.5 to 13% by weight of a second metal oxide selected from the group consisting of cobalt, copper, zinc, iron, silver and molybdenum, the combined weight of the oxides of the two metals being not greater than 14% by weight based on the weight of dry unimpregnated carbon. A particularly preferred carbon adsorbent product is one which contains 4 to 6% by weight of an oxide of a metal selected from the group consisting of copper, cobalt and zinc, and 4 to 6% by weight of a second oxide of a metal selected from the group consisting of cobalt, copper, zinc, iron, silver and molybdenum. All weights of metal oxide impregnants throughout this specification are based on the weight of dry unimpregnated carbon.

In order to impregnate carbon with the oxide of a single metal, the carbon is immersed in a solution containing 20 to 29% by weight of ammonia plus a compound of the impregnating metal which is soluble in the ammoniacal solution and decomposable into an oxide of the metal, the concentration of the metal compound being such as to give a metal oxide concentration in the range of 0.5 to 13% by weight upon subsequent heating of the carbon with attendant decomposition of the metal compound. The metal compound is generally a salt and preferably a carbonate or other organic salt.

After immersion of the carbon for sufficient length of time to yield a product of the desired composition, the wet carbon is removed from the excess impregnating solution, as for example by vacuum evaporation of the solution, or by filtration and preferably vacuum filtration. The wet carbon is then roasted at a temperature in the range of 200° to 500° C. in order to convert the metal compound in the impregnating solution into a corresponding metal oxide and to evaporate the water of the impregnating solution. The furnace in which the carbon is roasted is preheated to about 160° to 180° C. in order to heat the carbon rapidly. The carbon is heated up to 160° to 180° C. in about 5 to 30 minutes, the average time being about 10 minutes. The rapid heating of the carbon in the drying operation causes rapid liberation of gaseous ammonia, which has the effect of forcing the metal oxide impregnant into the pores of the carbon in the form of very thin surface layers on the carbon. The rapid liberation of ammonia also is beneficial in preventing the pores of the carbon from becoming clogged with the metal oxide impregnant. Where the metal compound in the impreganting solution is a carbonate, carbon dioxide is also liberated during the heating step, and this further aids in the impregnation of the pores of the carbon and in the prevention of plugging of the pores.

Heating may be carried out in either an inert atmosphere or in an oxygen-containing atmosphere. For example, the carbon may be roasted in an air current at temperatures in the range of about 200° to about 350° C. The roasting furnace is preheated to about 160° to 180° C. before introduction of the carbon, and then the furnace and the carbon are heated together to operating temperature. A preferred mode of heating is to pass a current of inert gas such as nitrogen through the carbon while tumbling in a suitable apparatus such as a rotary dryer at a temperature in the range of about 300° to about 500° C. and preferably about 400° to about 500° C. Tumbling time is that which is sufficient to convert the metal compound into the corresponding metal oxide. Good results have been obtained with 30 to 60 minutes of tumbling at 400° to 500° C.

When adsorbent carbon is to be impregnated with two metals according to this invention, either of two impregnation techniques may be used. The first is similar to that described for the impregnation of a single metal, except that the impregnating solution contains compounds of two metals to be impregnated. For example, the impregnating solution may contain compounds of copper and iron, copper and cobalt, copper and zinc, or zinc and molybdenum. It will be noted that one of the metals is always either cobalt, copper or zinc. The second metal is selected from the group consisting of cobalt, copper, zinc, iron, molybdenum and silver, the second metal of course being different from the first.

A second technique for impregnation of two metals is to immerse the carbon to be impregnated sequentially in solutions of each of the impregnating metals. Each solution is an aqueous ammoniacal solution containing 20 to 29% by weight of ammonia plus a compound and generally a salt of one metal to be impregnated. Different metals are contained in each impregnating solution. Generally two solutions are used and two metals are impregnated. It is not critical which metal is impregnated first.

Dry carbon is immersed in the first impregnating solution. The carbon is then removed from the impregnating solution, and excess solution is removed by any suitable means such as vacuum filtration. The carbon is then preferably dried at normal drying temperatures, i.e. 110 to 120° C. Excessive temperatures sufficient for roasting are avoided at this stage.

The carbon is then placed in the second impregnating solution, which contains about 20 to 29% by weight of ammonia, plus a compound of the second impregnating metal. After soaking in this solution the carbon is removed, the excess solution is removed by suitable means such as vacuum filtration, and the carbon is then roasted as aforedescribed in order to convert both metal compounds to corresponding metal oxides.

The impregnation process of the present invention is useful for the impregnation of any gaseous adsorbent carbon, but is particularly useful in the production of impregnated carbon products for use as tobacco smoke filters and particularly cigarette filters. Carbon impregnated with an oxide of copper, cobalt or zinc, either with or without an additional metal oxide selected from the group consisting of cobalt, copper, zinc, iron, molybdenum and silver, is highly effective in the removal of hydrogen cyanide and hydrogen sulfide from tobacco smoke streams. Other noxious gaseous components of cigarette smoke are also removed by carbon impregnated according to this invention without materially affecting the taste or the draw resistance of the cigarette.

Carbon and particularly charcoal impregnated according to the present invention can be used in any cigarette containing a charcoal filter. One such cigarette will now be described with reference to the sole figure of the drawing.

Referring to the sole figure of the drawing, 10 is a cigarette column of the dimensions ordinarily found in filter cigarettes, which is comprised of a mass of shredded tobacco 11, wrapped in cigarette paper 12. Attached to this column 10, by means of a paper wrapper 13, is a filter assembly. This assembly is originally prepared in a rod containing multiple filter units. This is sectioned and attached to the tobacco column 11 by methods commonly used in filter cigarette manufacture. The filter assembly consists of three parts—the plugs 15 and 16 and the filtering material packed in space 17 between the plugs. The plugs 15 and 16, one located next to the tobacco column 10 and the other at the end of the filter assembly remote from the tobacco, consist of fibrous tobacco smoke filtering material of the kind generally used in filter cigarette manufacture. It may for instance, be a plasticized bundle of cellulose acetate fibers of denier per filament between 1.5 and 25, and with a total denier between 30,000 and 90,000. Alternatively a short filter plug composed of convoluted creped paper may be used. In practice each fibrous or creped filter plug 15 and 16 is respectively wrapped in an additional paper wrapper 18, 19 to facilitate handling during the filter making process. The length of each of plugs 15 and 16 may be between 5 and 10 millimeters and its diameter such that the finished assembly will match the diameter of the tobacco column 11. The two plugs 15 and 16 are enclosed within and secured in coaxial alignment by a tubular wrapper 20 of paper which holds them in spaced-apart relationship so as to form a chamber 17 between them whose walls are defined by the opposed ends of plugs 15 and 16 and by the exposed inner annular surface of wrapper 20 between the plugs.

Chamber 17 is loosely packed with the filtering material as described below. This chamber may be from 2 to 15 millimeters in length, and may contain from 40 to 400 milligrams of granular impregnated filtering material generally having a mesh size in the range of about 8 to 50.

Other cigarettes containing charcoal filters are illustrated in Touey United States Patent 2,881,770, issued Apr. 14, 1959, and Schur United States Patent 2,915,069, issued Dec. 1, 1959. The impregnated carbon of this invention may be substituted for the unimpregnated carbon described in the patents with improved adsorption of noxious gaseous constituents of the cigarette smoke and particularly the adsorpion of hydrogen cyanide and hydrogen sulfide. When filters of this type are employed, the impregnated carbon is of a much finer mesh size, for example on the order of 100–300 mesh.

This invention will now be described in further detail with respect to specific embodiments thereof.

A series of stock solutions for use in impregnating carbon were prepared as follows:

*Stock Solution 1.*—21.0 grams of cobaltous carbonate (reagent grade) was dissolved in an aqueous solution containing about 15 ml. of concentrated ammonium hydroxide ($NH_3$ approximately 28% by weight) and about 50 ml. of aqueous citric acid (citric acid 40% by weight).

The cobaltous ion was allowed to oxidize to the cobaltic ion by allowing the solution to stand in air with stirring for one hour, and the solution was diluted to 200 ml. with concentrated ammonium hydroxide and then saturated with gaseous $NH_3$. This gave a solution containing 52 grams per liter of cobalt (as Co), 93 grams per liter of citric acid, and 28% by weight of ammonia.

*Stock Solution 2.*—70.0 grams of cupric acetate monohydrate (reagent grade) was dissolved in sufficient concentrated ammonium hydroxide ($NH_3$ approximately 28% by weight) to form a solution having a volume of 200 ml. and containing 113 grams per liter of copper.

*Stock Solution 3.*—25.0 grams of zinc carbonate (reagent grade) was dissolved in sufficient concentrated ammonium hydroxide ($NH_3$ approximately 28% by weight) to form a solution having a volume of 200 ml. and containing 65 grams per liter of zinc.

*Stock Solution 4.*—120 grams of ferric citrate trihydrate (USP VIII grade) was dissolved in sufficient ammonium hydroxide ($NH_3$ approximately 28% by weight) to form a solution having a volume of 200 ml. and containing 112 grams per liter of iron.

*Stock Solution 5.*—28.0 grams of molybdenum trioxide (reagent grade, 85% $MoO_3$ by weight) was dissolved in sufficient concentrated ammonium hydroxide ($NH_3$ approximately 28% by weight) to form a solution having a volume of 200 ml. and containing 79 grams per liter of molybdenum.

*Stock Solution 6.*—11.0 grams of silver carbonate (reagent grade) was slurried with about 5 cc. of aqueous citric acid (citric acid 40% by weight). This slurry was mixed with sufficient concentrated ammonium hydroxide ($NH_3$ approximately 28% by weight) to form a solution having a volume of 200 ml. and containing 43 grams per liter of silver.

The above stock solutions were used in making up the impregnating solutions described in the examples which follow.

*Example 1*

Samples of 14 to 40 mesh (U.S. Standard Sieve series) absorbent carbon (Pittsburgh Activated Carbon Company, Grade BPL), each weighing 20 grams, were soaked for 10 minutes with stirring in 30 ml. of impregnating solution. The impregnating solutions were prepared by taking either 30 ml. of a single stock solution or 15 ml. each of two stock solutions as described above. Each of the impregnating solutions contained a compound of at least one metal selected from the group consisting of cobalt, copper and zinc (stock solutions 1, 2 and 3 respectively). The excess solution was removed by vacuum filtration. The wetted carbon was roasted in a rotary tumbler for 30 to 60 minutes in a slow stream of nitrogen at temperatures between 400 and 500° C. The tumbler was preheated to about 165° C. before introduction of the carbon and thereafter heated to the operating temperature in the range of 400° to 500° C. Table I below indicates, for each sample, the stock solutions used to make up the impregnating solution, the metals present in solution, and the concentration of the metal (on the metal basis) in grams per liter. Table I also indicates the metal oxide or oxides present in the impregnated carbon and the weight percentage of each metal oxide, based on the weight of dry unimpregnated carbon.

TABLE I

| Impregnating Solution | | | Impregnated Carbon | | Metal Group No. |
|---|---|---|---|---|---|
| No. | Metal | Conc. | Metal Oxide | Wt. Percent | |
| 1 | Co | 26 | CoO | 2.4 | } 1 |
| 4 | Fe | 56 | $Fe_2O_3$ | 5.4 | |
| 2 | Cu | 57 | CuO | 5.5 | } 2 |
| 4 | Fe | 56 | $Fe_2O_3$ | 5.1 | |
| 3 | Zn | 33 | ZnO | 5.4 | } 3 |
| 4 | Fe | 56 | $Fe_2O_3$ | 7.4 | |
| 1 | Co | 26 | CoO | 2.0 | } 4 |
| 2 | Cu | 57 | CuO | 5.8 | |
| 1 | Co | 26 | CoO | 1.8 | } 5 |
| 3 | Zn | 33 | ZnO | 3.4 | |
| 1 | Co | 26 | CoO | 2.2 | } 6 |
| 5 | Mo | 40 | $MoO_3$ | 3.6 | |
| 2 | Cu | 57 | CuO | 5.5 | } 7 |
| 3 | Zn | 33 | ZnO | 3.4 | |
| 2 | Cu | 57 | CuO | 5.9 | } 8 |
| 5 | Mo | 40 | $MoO_3$ | 5.6 | |
| 3 | Zn | 33 | ZnO | 2.8 | } 9 |
| 5 | Mo | 40 | $MoO_3$ | 4.1 | |
| 1 | Co | 52 | CoO | 4.6 | 10 |
| 2 | Cu | 113 | CuO | 9.6 | 11 |
| 3 | Zn | 65 | ZnO | 6.2 | 12 |

*Example 2*

Samples of 14 to 40 mesh (U.S. series) adsorbent carbon (Pittsburgh Activated Carbon Company Grade BPL), each weighing 20 grams, were soaked for 10 minutes with stirring in 20 ml. of a first impregnating solution. Excess solution was removed by vacuum filtration and the carbon was dried at 110° C. The carbon was then soaked in 20 ml. of a second impregnating solution. Excess solution was removed by vacuum filtration. The wetted carbon was roasted in a rotary tumbler from 30 to 60 minutes in a slow stream of nitrogen between 400 and 500° C. The tumbler was preheated to about 165° C. before introduction of the carbon and thereafter heated to the operating temperature in the range of 400° to 500° C. Each of the impregnating solutions consisted of a 20 ml. portion of a single stock solution as aforedescribed. Table II below indicates, for each sample, the metal present in the impregnating solution and the concentration of the metal in grams per liter. Table II also indicates the metal oxides present in the impregnated carbon and the weight percentage of each metal oxide, based on the weight of dry unimpregnated carbon.

TABLE II

| First Impregnating Solution | | Second Impregnating Solution | | Impregnated Carbon | |
|---|---|---|---|---|---|
| Metal | Conc. | Metal | Conc. | Metal Oxide | Wt. Percent |
| Ag | 43 | Co | 52 | CoO / $Ag_2O$ | 4.1 / 3.8 |
| Ag | 43 | Cu | 113 | CuO / $Ag_2O$ | 10.3 / 3.7 |
| Ag | 43 | Zn | 65 | ZnO / $Ag_2O$ | 6.2 / 3.7 |

Carbon impregnated according to any of the procedures in the foregoing examples may be used in any tobacco smoke filter and particularly in cigarette filters such as those described above. The use of carbon thus impregnated greatly increases the removal of hydrogen cyanide and hydrogen sulfide, and improves the taste of the cigarette when compared with an otherwise identical cigarette having an unimpregnated carbon filter.

Although various embodiments have been described in the foregoing discussion and experiments for the purposes of illustration, many modifications will occur to those skilled in the art and can be made without departing from the scope of this invention except as is limited in the appended claims.

What is claimed is:

1. A process for impregnating an adsorbent material for use as a tobacco smoke filter, which comprises the steps of
    (1) soaking an adsorbent material selected from the group consisting of activated carbon, alumina, natural and synthetic clays and silica gel and having a particle size of 8 to 300 mesh and having a surface area in excess of 1 million square centimeters per gram in an aqueous ammoniacal impregnating solution consisting essentially of at least about 20% by weight of ammonia and at least one metal compound selected from the compounds of cobalt, copper and zinc which are soluble in said solution and decomposable into an oxide of said metal,
    (2) removing said adsorbent material from said impregnating solution,
    (3) drying said adsorbent material in an inert atmosphere by (a) heating to a temperature in the range of about 160° C. to about 180° C. in from about 5 minutes to about 30 minutes and (b) thereafter heating at a temperature in the range of about 200° to about 500° C. to cause said metal compound to be decomposed into an oxide of said metal, and
    (4) recovering an adsorbent material product impregnated with at least one metal oxide selected from the oxides of cobalt, copper and zinc.

2. A process according to claim 1 wherein said adsorbent material is activated carbon and said impregnating solution is substantially saturated with ammonia.

3. A process according to claim 2 in which the amounts of metal compounds in said solution are such that the impregnated carbon product contains from 0.5 to 13% by weight of said metal oxide selected from the oxides of cobalt, copper, and zinc, the total content of metal oxides being not in excess of 14%, based on the weight of dry unimpregnated carbon.

4. A process according to claim 2 in which said impregnating solution also contains a second metal compound selected from compounds of cobalt, copper, zinc, iron, silver and molybdenum which are soluble in said solution and decomposable into an oxide selected from the oxides of cobalt, copper, zinc, iron, silver and molybdenum with the proviso that the amounts of said metal compounds in said solution are such that the impregnated carbon product contains from 0.5 to 13% by weight of a metal oxide selected from the oxides of cobalt, copper and zinc, and 0.5 to 13% by weight of said metal oxide selected from the oxides of cobalt, copper, zinc, iron, silver and molybdenum, the combined weight of said metal oxides being not in excess of 14%, based on the weight of dry unimpregnated carbon.

5. A process according to claim 2 in which said carbon is dried in an inert nitrogen atmosphere at a temperature in the range of 400 to 500° C.

6. A process according to claim 3 in which said carbon is soaked in a first impregnating solution containing a compound of one impregnating metal and is thereafter soaked in a second impregnating solution containing a compound of a second metal.

References Cited

UNITED STATES PATENTS

| 1,400,203 | 12/1921 | Backhaus | 252—454 |
| 1,519,470 | 12/1924 | Wilson | 252—447 |
| 1,577,189 | 3/1926 | Patrick | 252—454 |
| 2,108,860 | 2/1938 | Kauffman | 131—10 |
| 2,511,290 | 6/1950 | Morrell et al. | 252—447 |
| 2,523,875 | 9/1950 | Morrell et al. | 252—447 |
| 2,792,006 | 5/1957 | Marek | 131—208 |
| 2,795,227 | 6/1957 | Seldeen | 131—10 |
| 2,815,760 | 12/1957 | Schreus et al. | |
| 2,913,419 | 11/1959 | Alexander | 117—100 |
| 2,920,051 | 1/1960 | Wiig et al. | 252—447 |
| 2,966,157 | 12/1960 | Touey et al. | 131—208 |
| 2,976,183 | 3/1961 | Arthur | 117—100 |
| 3,033,212 | 5/1962 | Touey et al. | 131—208 |
| 3,041,159 | 6/1962 | Smith | 117—100 |
| 3,088,983 | 5/1963 | Rosenthal | 252—447 |

FOREIGN PATENTS

| 7,808 | 1905 | Great Britain. |
| 28,470 | 1902 | Great Britain. |
| 654,994 | 1951 | Great Britain. |

WILLIAM D. MARTIN, *Primary Examiner.*

M. SOFOCLEOUS, E. J. CABIC,
*Assistant Examiners.*